United States Patent
Cohen et al.

(10) Patent No.: US 7,107,535 B2
(45) Date of Patent: Sep. 12, 2006

(54) SYSTEM AND METHOD FOR PROVIDING CUSTOMIZED WEB PAGES

(75) Inventors: Tal Cohen, Tucker, GA (US); Nissim Harel, Tucker, GA (US)

(73) Assignee: ClickFox, LLC, Atlanta, GA (US)

( * ) Notice: Subject to any disclaimer, the term of this patent is extended or adjusted under 35 U.S.C. 154(b) by 666 days.

(21) Appl. No.: 09/778,562

(22) Filed: Feb. 7, 2001

(65) Prior Publication Data

US 2002/0152237 A1    Oct. 17, 2002

Related U.S. Application Data

(60) Provisional application No. 60/206,647, filed on May 24, 2000.

(51) Int. Cl.
*G06K 3/00* (2006.01)

(52) U.S. Cl. .................................. 715/736; 715/763

(58) Field of Classification Search ........... 345/745, 345/749, 748, 760, 755, 711, 712, 811, 812, 345/813, 853–855; 715/748–749, 853–855, 715/734–739, 802, 803–805, 762–763
See application file for complete search history.

(56) References Cited

U.S. PATENT DOCUMENTS

| | | | |
|---|---|---|---|
| 5,220,655 A | 6/1993 | Tsutsui | |
| 5,717,923 A | 2/1998 | Dedrick | |
| 5,727,129 A | 3/1998 | Barrett et al. | |
| 5,878,384 A | 3/1999 | Johnson et al. | |
| 5,948,061 A | 9/1999 | Merriman et al. | |
| 5,960,409 A | 9/1999 | Wexler | |
| 6,006,197 A | 12/1999 | d'Eon et al. | |
| 6,014,638 A | 1/2000 | Burge et al. | |
| 6,021,439 A | 2/2000 | Turek et al. | |
| 6,044,376 A | 3/2000 | Kurtzman, II | |
| 6,052,730 A | 4/2000 | Felciano et al. | |
| 6,055,510 A | 4/2000 | Henrick et al. | |
| 6,088,722 A | 7/2000 | Herz et al. | |
| 6,112,238 A | 8/2000 | Boyd et al. | |
| 6,112,240 A | 8/2000 | Pogue et al. | |
| 6,300,947 B1 * | 10/2001 | Kanevsky | 345/866 |
| 6,353,822 B1 * | 3/2002 | Lieberman | 707/3 |
| 6,401,118 B1 * | 6/2002 | Thomas | 709/224 |
| 6,448,980 B1 * | 9/2002 | Kumar et al. | 345/745 |
| 6,463,455 B1 * | 10/2002 | Turner et al. | 709/200 |
| 6,564,170 B1 * | 5/2003 | Halabieh | 702/181 |
| 6,574,793 B1 * | 6/2003 | Ngo et al. | 725/32 |
| 6,606,581 B1 * | 8/2003 | Nickerson et al. | 702/186 |
| 6,615,247 B1 * | 9/2003 | Murphy | 709/217 |
| 6,658,415 B1 * | 12/2003 | Brown et al. | 707/10 |

(Continued)

*Primary Examiner*—Steven P. Sax
(74) *Attorney, Agent, or Firm*—Troutman Sanders LLP; James E. Schutz

(57) ABSTRACT

An invention for customizing a web site by gathering information from a web site visitor's sessions while the user is using the web site. The visitor's session information is compared with expected visitor behavior, based on the present structure of the web site. Using pre-programmed basic comparison rules and computer based mathematical models, matrices are used to represent statistical information about the visitor's sessions on the web site. The statistical information is used to extract visitor behavior which was unexpected (anomalies). Anomalies are grouped into recommendations. These recommendations are used to automatically customize the web site. In the alternative, information is provided to the web site administrator to customize the web site to be more efficient and visitor friendly, maximizing the operation of the Web site and promoting more frequent visits.

47 Claims, 5 Drawing Sheets

U.S. PATENT DOCUMENTS

| | | |
|---|---|---|
| 6,763,334 B1 * | 7/2004 | Matsumoto et al. .......... 705/14 |
| 6,785,717 B1 * | 8/2004 | Nickerson et al. .......... 709/219 |
| 6,842,877 B1 * | 1/2005 | Robarts et al. ............. 715/708 |
| 6,857,119 B1 * | 2/2005 | Desai ......................... 717/145 |
| 6,859,784 B1 * | 2/2005 | van Duyne et al. ........... 705/10 |
| 2002/0013834 A1 * | 1/2002 | Esakov et al. .............. 709/223 |

* cited by examiner

SYSTEM AND METHOD FOR PROVIDING CUSTOMIZED WEB PAGES

This application claims priority from U.S. provisional patent application Ser. No. 60/206,647, filed May 24, 2000, entitled "SYSTEM FOR PROVIDING CUSTOMIZED INTERNET WEB PAGES."

TECHNICAL FIELD

This invention relates to customizing Internet web sites and, more particularly, to customizing Internet web sites based on the visitation behavior of visitors to that Internet web site in a manner to improve the operation of the Internet web site.

BACKGROUND OF THE INVENTION

The world wide web has exploded with new web sites. Today, most businesses want their product advertisements to reach the world market rather than the limited audience available before the Internet was invented. Regardless of how many potential customers visit the web site of the business, the web site must retain the attention of those potential customers. Even more important than the initial attraction, the web site must be constructed in a way that makes the customer want to stay and access more products, images, and items the web site owner wishes the visitor to access during their visit. If the web site is not initially constructed in a manner to allow or entice the visitor to access the objects of interest, there should be a tool to evaluate the visitor's activity on the web site and implement or offer solutions to modify the web site. The modification suggestions should allow the web site to become more efficient and easier to use for visitors, which would likely entice the visitors to make their user session longer and purchase more products. Unlike a physical store that a customer may visit, which has the entrance and exit pre-designed and somewhat controlling the visit, a web site may be exited at any time, and often is, if the web site visitor is frustrated at the complexity of navigating the objects of interest.

Despite the efforts of the prior art, there is still a need for a method that implements an accurate diagnosis of the web site, delivers solutions to repair the web site in an efficient manner, presents those solutions in a manner that the web site may be accurately changed to address the problems, or alternatively repairs the problems automatically.

SUMMARY OF THE INVENTION

The present invention overcomes the above described void in the prior art by utilizing a method, device, and algorithm to track and bundle the user interactions with the web site structure via a set of matrices. Initially, the web site itself is analyzed for its present structure. Analyzing the web site results in a list of pages that are included in the web site and how the pages are connected to each other (the pages inter-relationship). The invention uses a web-robot class program to record this information (one example for a web-robot program is the Acme-Spider, available at: http://www.acme.com/java/software/Acme.Spider.html). A web-robot traverses the web starting at a given Uniform Resource Locator (network addresses). It fetches hypertext markup language (HTML) files and parses them for new network addresses to look at. All files it encounters, HTML or otherwise, are returned and may be recorded.

User sessions are used to model user interactions with the web site. User sessions are usually defined collectively by Identity (who is accessing the site), Location (which pages each user accessed, and in what order), and Time (when did the access occur). In other words, a user session can be defined roughly as a series of continuous accesses to the site done by the same user. To determine what constitutes a series of continuous accesses to the site, an approximation method (an Internet web-robot program) is used to track and approximate the user sessions.

Subsequently, all the user sessions are analyzed according to web-specific parameters. These web-specific parameters include: distance, step, and class. This analysis, along with a set of basic rules, and the structure of the web site, are used in forming a series of matrices and structures to represent the statistical information. The statistical information is represented such that inefficiencies in the Internet web site (web site) may be determined and eliminated manually or automatically.

Two such inefficiencies, also known as anomalies, are objects of interest not having direct connections which should have a direct connection, and objects which do not need a direct connection that have a direct connection. A direct connection is when two items of interest or web pages (objects of interest) may be accessed with a single click, typically through a hyperlink. Anomalies in the design are the result of a difference between the designer intent and expectation and the actual site visitors behavior. Any difference between the expected behavior and the actual behavior is an anomaly, because the designer of the web site did not intend it. Rules may be applied to change the web site automatically in a way that reduces or removes the anomaly. Generating anomaly reports assist the designer in eliminating the anomalies, and provide recommendations to improve the web site. For example, assume that a web-based sport clothing retailer site has a home page (generally the initial page of the web site) that links to three pages that advertise sport shoes, shirts, and pants. The page that advertises shirts has a link to a page that advertises hats, while no such link exists in the other two pages. Yet, by analyzing the actual visitor behavior, it is found that 30% of the people, who accessed the sports shoes and the pants pages, also accessed the hat page. This is an anomaly, because the site designers did not expect users interested in sports shoes and pants to also be interested in hats (otherwise, they would have designed the site structure differently). Therefore, the invention will recommend either moving the link to the hat page to the home page, or providing a link to the hat page from all the three sub pages. Adding and removing links from the pages automatically to reduce the anomaly may also be performed.

DETAILED DESCRIPTION

Now referring in detail to the drawings, wherein like numerals refer to like parts throughout the several views. Prior to tracking and recording user sessions, and applying them to repair anomalies of the web site, the construction of the web site must be analyzed and utilized to setup data matrices and structures. It is the information from these matrices and structures which is mapped and analyzed to repair the web site. Mapping the data tracked during the user's sessions involves properly putting the appropriate data in the appropriate matrix or structure. Thus, an accurate accounting of the parameters of the web site and the use of matrices and structures to store the data is essential.

Figure 1:
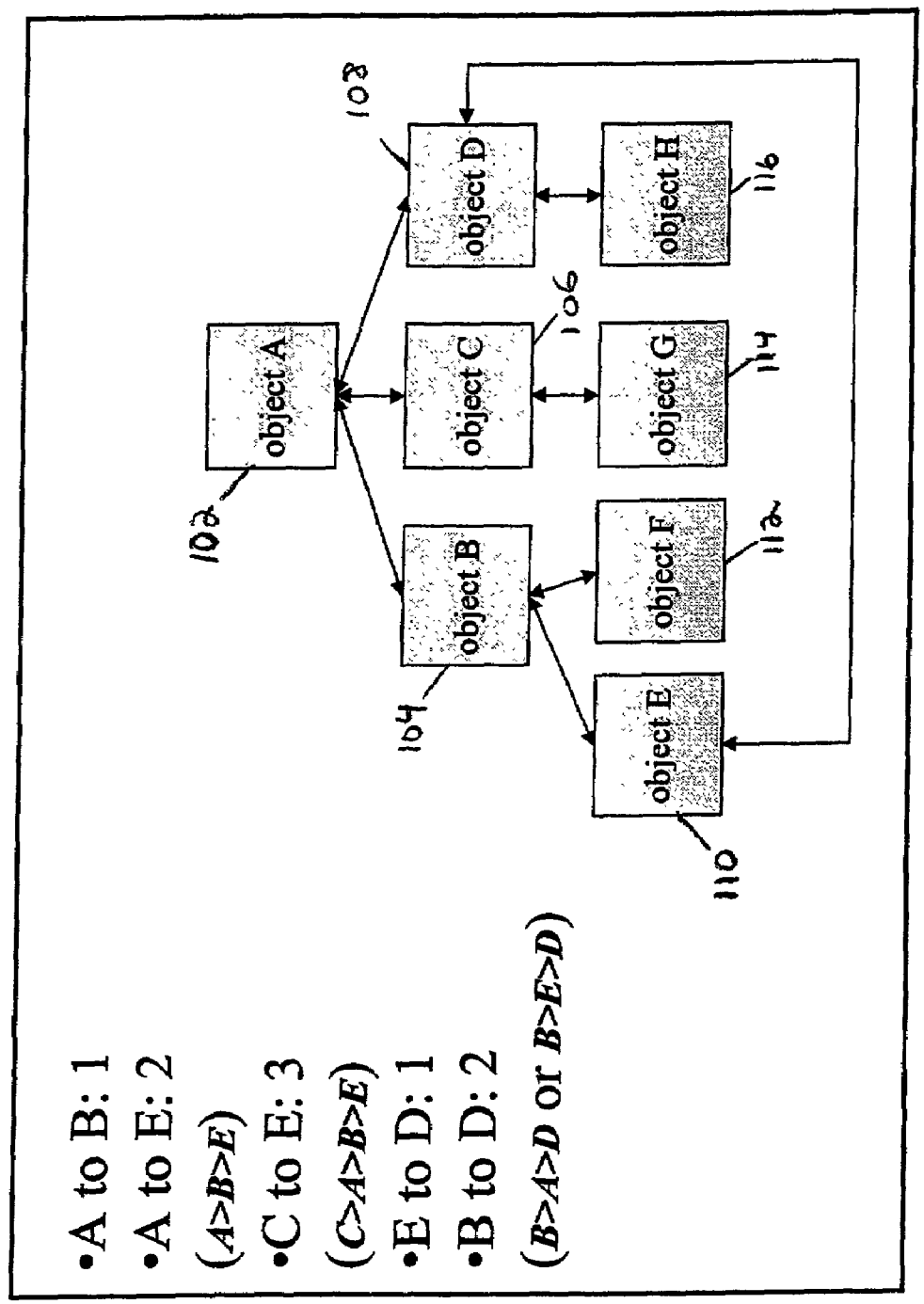
FIG. 1 is a structure diagram illustrating an exemplary embodiment of the web site construction and the interconnections of the objects of interest within the web site.

FIG. 1 is a structure diagram illustrating an exemplary embodiment of the web site construction and the interconnections of the objects of interest within the web site. The first data to gather in analyzing the construction of a web site is a list of pages that are included in the site. In the case of the web site construction illustrated in FIG. 1, each block (102, 104, 106, 108, 110, 112, 114, and 116) represents an object of interest. In the broader sense, the term "objects of interest" refers to any kind of user access activity that may be recorded, and/or tracked. Currently, an object of interest is used to describe either a page or any other item (such as images, videos, etc.), that is accessible from the site, and any script of interest that may have been executed on behalf of the user. A list is kept of all objects of interest for further use. For simplicity of illustration, in FIG. 1, each object of interest is a web-page, which is the visitor experience of a collection of accesses to the web site. The web site construction analysis is recorded in memory (preferably read only memory) or stored in a database, and contains the following parameters:

1. A numeric key (or identifier)—a numeric representative identifier.
2. The primary name of the page—name of the page expressed in alphanumeric characters.
3. Aliases to the name of the object—the alias to the name of the object of interest is an alternative representation to access that object of interest.
4. A list of all the children of a certain page—all the pages that may be reached directly from the current page. For example, object B 104, object C 106 and object D 108 are all the children of object A 102. These are the objects that may be reached directly by clicking on a link from object A 102. Likewise, object E 110 and object F 112 are the children of object B 104, object G 114 is the child of object C 106, and object H 116 and object E 110 are the children of object D 108.
5. A list of all the parents of a certain objects—A parent is an object that can be used to reach a certain page with a direct link. In a hierarchy of objects, the parent objects would be accessible prior to the children objects, thus closer to the web site homepage. For example, object B 104 is the parent of both object E 110 and object F 112. Likewise, object C 106 is the parent of object G 114, object D 108 is the parent of object E 110 and object H 116, and object A 102 is the parent of object B 104, object C 106, and object D 108.
6. A hash table that stores object distances—object distance is the smallest number of clicks or links needed to get from one object of interest to another object of interest. For example, a user can get from object A 102 to object B 104 by clicking on a link in page A 102. Therefore, the distance between object A 102 and object B 104 is 1. A user can get from object A 102 to object E 110 by clicking on a link in object A 102, getting to object B 104, and then clicking on a link in object B 104 to get to object E 110. Thus, the distance between object A 102 and E 110 is 2. A user can get from object C 106 to object E 110 by clicking on a link to object A 102, then clicking on a link to object B 104, and finally, clicking on a link to object E 110. Thus, the result is a distance of 3 from object C 106 to object E 110. A user can get from object B 104 to object D 108 in two ways: either via object E 110 or via object A 102. In both cases the distance is 2.

A full descriptions of the analysis for the web site illustrated in FIG. 1 would contain numeric keys, the primary name of the objects, aliases to the names of objects, and a hash table of all the distances between each of the objects of interest object A 102, object B 104, object C 106, object D 108, object E 110, object F 112, object G 114, and object H 116. In addition, each of the aforementioned objects of interest's children and parents would be stored as explained above.

Subsequent to the analysis and storage of the web site construction parameters, the invention records the web site's user interactions (user sessions). There are three primary dimensions of users sessions with a web site:

1. Identity—who is accessing the site?
2. Location—which pages did each user access, and in what order?
3. Time—when did the access occur?

These three dimensions are incorporated into a single entity called a session. A session can be defined as a series of continuous accesses to the site done by the same user. Unfortunately, it is difficult (if not impossible) to determine exactly what constitutes a series of continuous accesses to the site, as it involves knowing what a user's intentions were when interacting with the site. To overcome this problem, a method is used by which educated guesses are use to approximate the sessions. Naturally, the approximation method is closely coupled with the means by which the user activity is tracked.

One embodiment of the invention uses HTTP logs to record and track user activity and construct sessions of interaction with the web site. It should be noted that the use of HTTP logs could be substituted by any other method to record user behavior, or a combination of several methods. Examples of these methods can be the use of cookies, the use of packet-sniffers, the use of embedded objects that send access information to the server (also known as web bugs), etc. With HTTP logs (and without using cookies), identity is determined by user's IP address, the object the user requested determines location, and the time stamp of the access recorded in the HTTP log determines the time.

Figure 2:
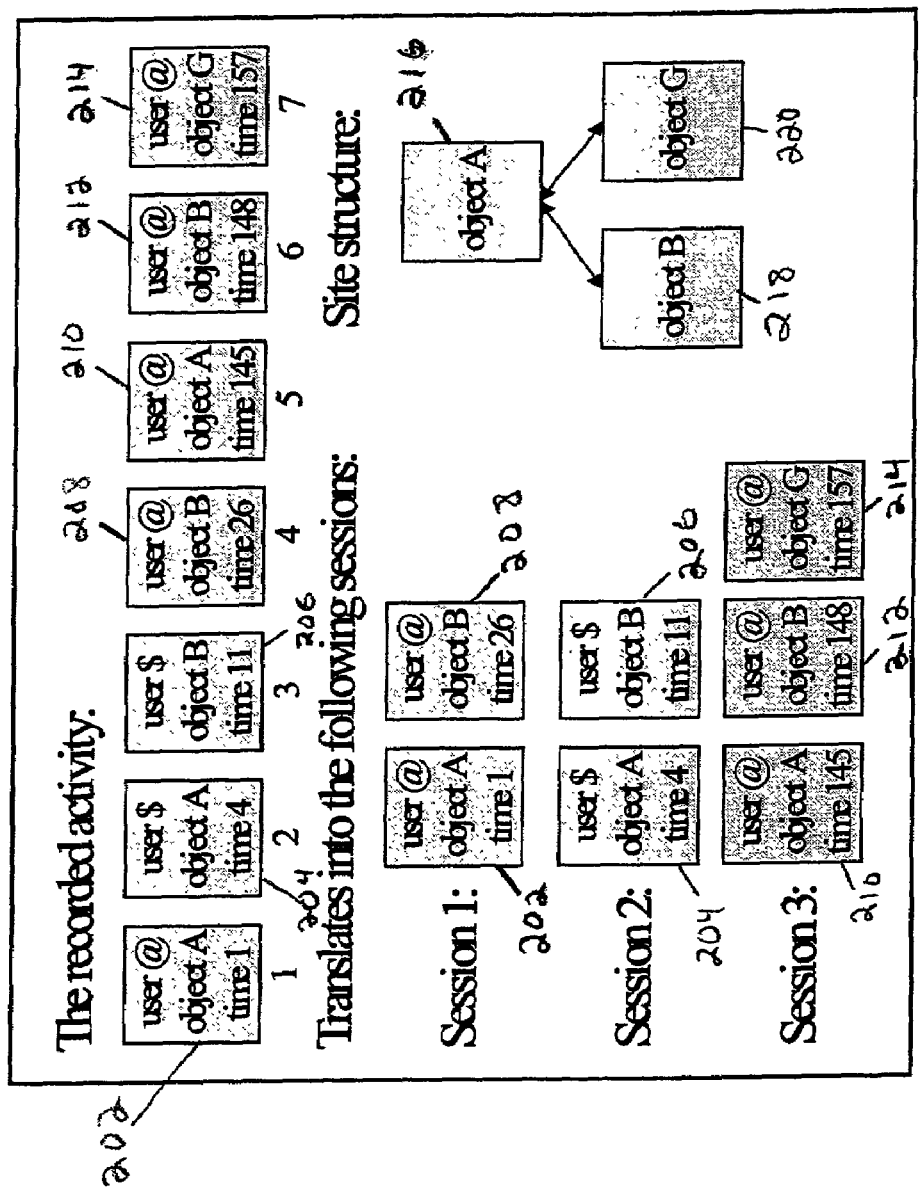
FIG. 2 is a data structure diagram illustrating the user sessions on a web site that would be tracked and recorded in accordance with an exemplary embodiment of the present invention.

FIG. 2 is a data structure diagram illustrating the user sessions on a web site that would be tracked and recorded in accordance with an exemplary embodiment of the present invention. Tracking the user session involves collecting various data concerning the user's progress while visiting the web site. When to start a new user session may be one problem with using HTTP logs. In one exemplary embodiment, pages accessed by user are grouped into one list and a decision whether to start a new session is made, depending on the time gap between two consecutive accesses. If the gap is more than a pre-determined time period, the session is broken into two different sessions.

Another problem with HTTP logs is that they record only accesses to the server. Using the HTTP logs, it may be difficult to record users who use the browser cache devices (stored accesses to pages that have already been accessed recently) to re-accesses a page. This problem can be overcome by using the shortest-distance between two accesses as a way to estimate the progress of the session.

According to FIG. 2, the recorded activity constitutes 7 accesses, done by 2 users, which are identified as user $ and user @ (IP address may be used to determine user identification). Accesses 202, 208, 210, 212, and 214 were done by user @, while accesses 204 and 206 were done by user $. Assume the website is constructed of three objects of interest, object A 230, object B 232, and object G 234. Further assume that the pre-determined allowed gap between two accesses within one session is 100 units of time. The gap between access 208 and access 210 is 145−26=119>100. Therefore, access 210 belongs to a new session, different from access 208. The result is three different sessions, depicted at the bottom part of FIG. 2. Session 1 constitutes one session by user @ and consists of blocks 216 and 218. In Session 1, user @ accessed object A 230 and then object B 232. Session 2 is a session by user $ and consists of blocks 220 and 222. In Session 2, user $ accessed object A 230 and also object B 232. Finally, Session 3 by user @, consists of block 224, block 226, and block 228. In Session 3, user @ accessed object A 224, then object B 232, and finally object G 228.

Figure 3:
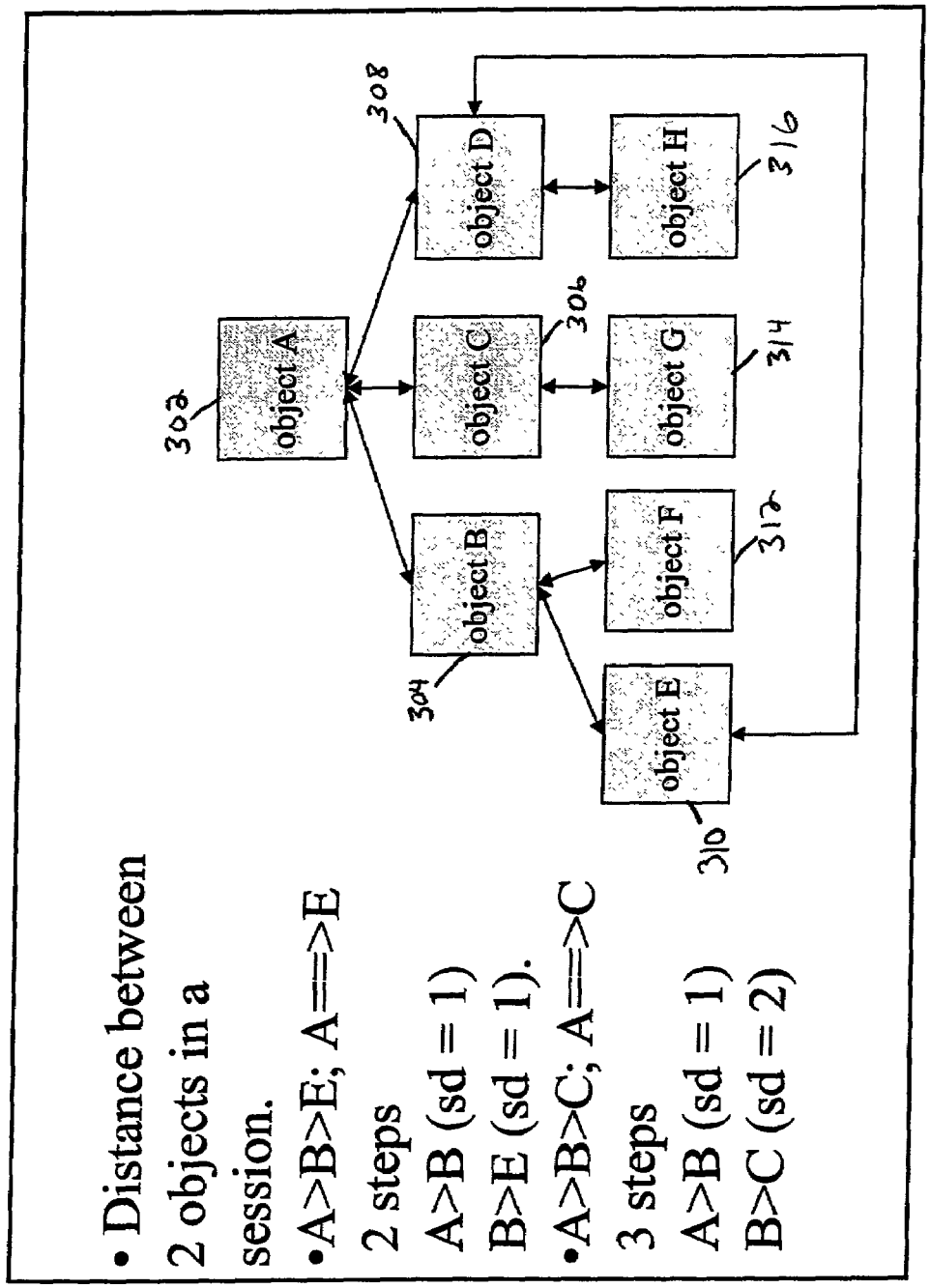
FIG. 3 is an exemplary embodiment of the present invention illustrating the concept of Step.

FIG. 3 is an exemplary embodiment of the present invention illustrating the concept of Step. Step is the distance between two objects of interest that are actually accessed during a user session. Thus, the distance of the path actually utilized to access one object from another during a user session. In FIG. 3, assume that a user accessed object A 302, then object B 304 and finally object E 310. The number of steps between objects A 302 and object E 310 is 2, because the sum of the distances between objects A 302 and B 304, and objects B 304 and object E 310 is 1+1=2.

In another example, suppose the actual user session was object A 302→object B 304→3 object A 302→3 object C 306. In this exemplary embodiment in which HTTP logs are relied on to reconstruct the sequence of accesses for each user, this user session may be recorded by the HTTP logs as a session: object A 302→3 object B 304→3 object C 306.

Despite the absence of a direct connection between objects B and C, they appear in the recorded session consecutively. This example demonstrates one of the disadvantages of using HTTP logs to reconstruct the user session. The actual session, object A 302→3 object B 304→3 object A 302→4 object C 306, was not recorded because object A 302 was accessed twice during the session. The second time the user accessed object A 302, the object was already present in the user's local browser cache. The browser did not have to initiate a request to the site HTTP server in order to retrieve the object. Thus, the access to object A 302 was recorded once rather than twice. To alleviate this problem and to better reconstruct the users sessions, an embodiment of the present invention uses the distance between two objects to define the number of steps between two objects. In FIG. 3, the number of steps between object B 304 and object C 306 is 2, as it is the distance between the two objects. Thus, the total number of steps between object A 302 and object C 306 in this session is 3.

Figure 4:
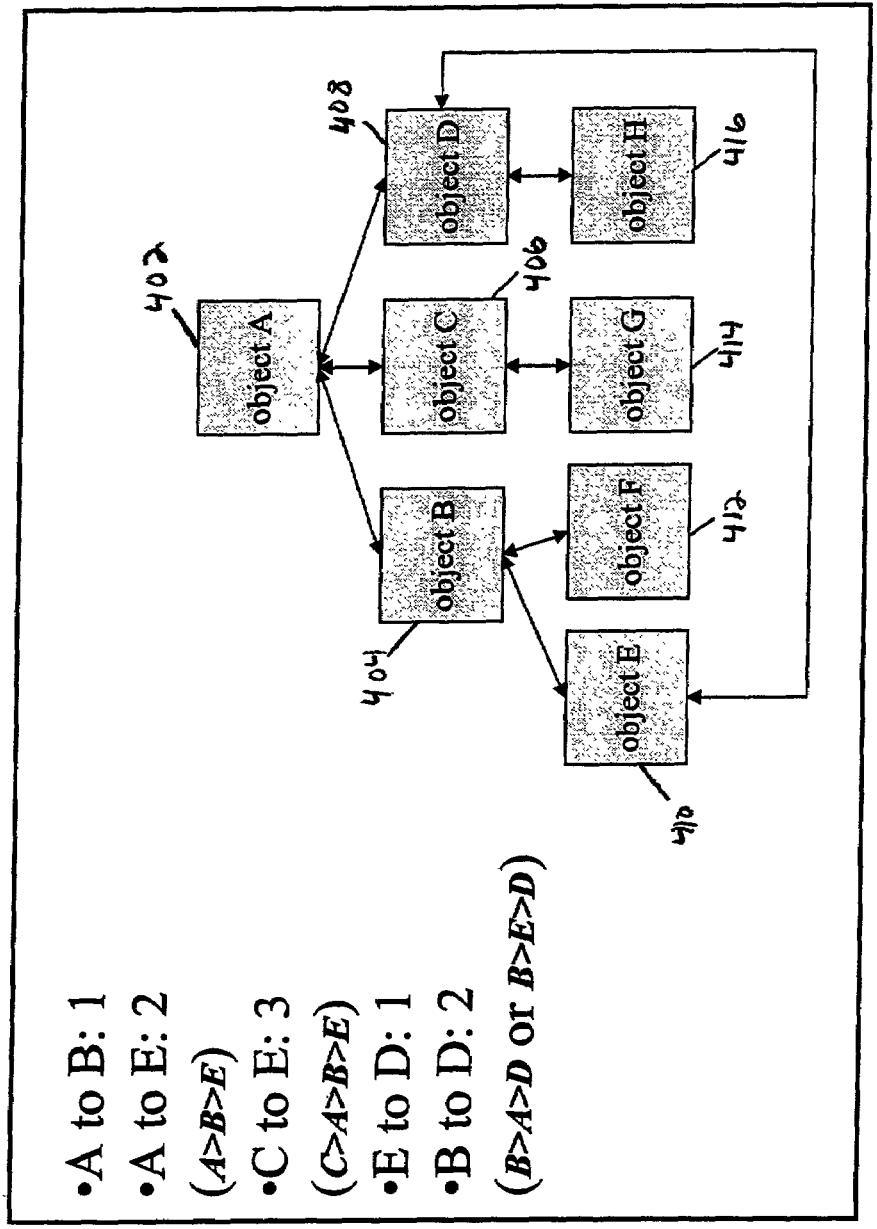
FIG. 4 illustrates the concept of class in an exemplary embodiment of the invention.

FIG. 4 illustrates the concept of class in an exemplary embodiment of the invention. Dividing web pages into classes is another way to categorize web pages. The term class is used to designate the distance of a certain object from the entrance page of the site, or the "official homepage" (homepage) of the site. The assumption behind the use of the class concept is that most users will start their interaction with the web site with this page and proceed onward. The base object 402, the homepage has class 0. Objects B 404, C 406, and D 408, which are directly linked from the base page, are at class 1. Objects E 410, F 412, G 414, and H 416, which are at distance of 2 from the base page, constitute class 2.

Figure 5:
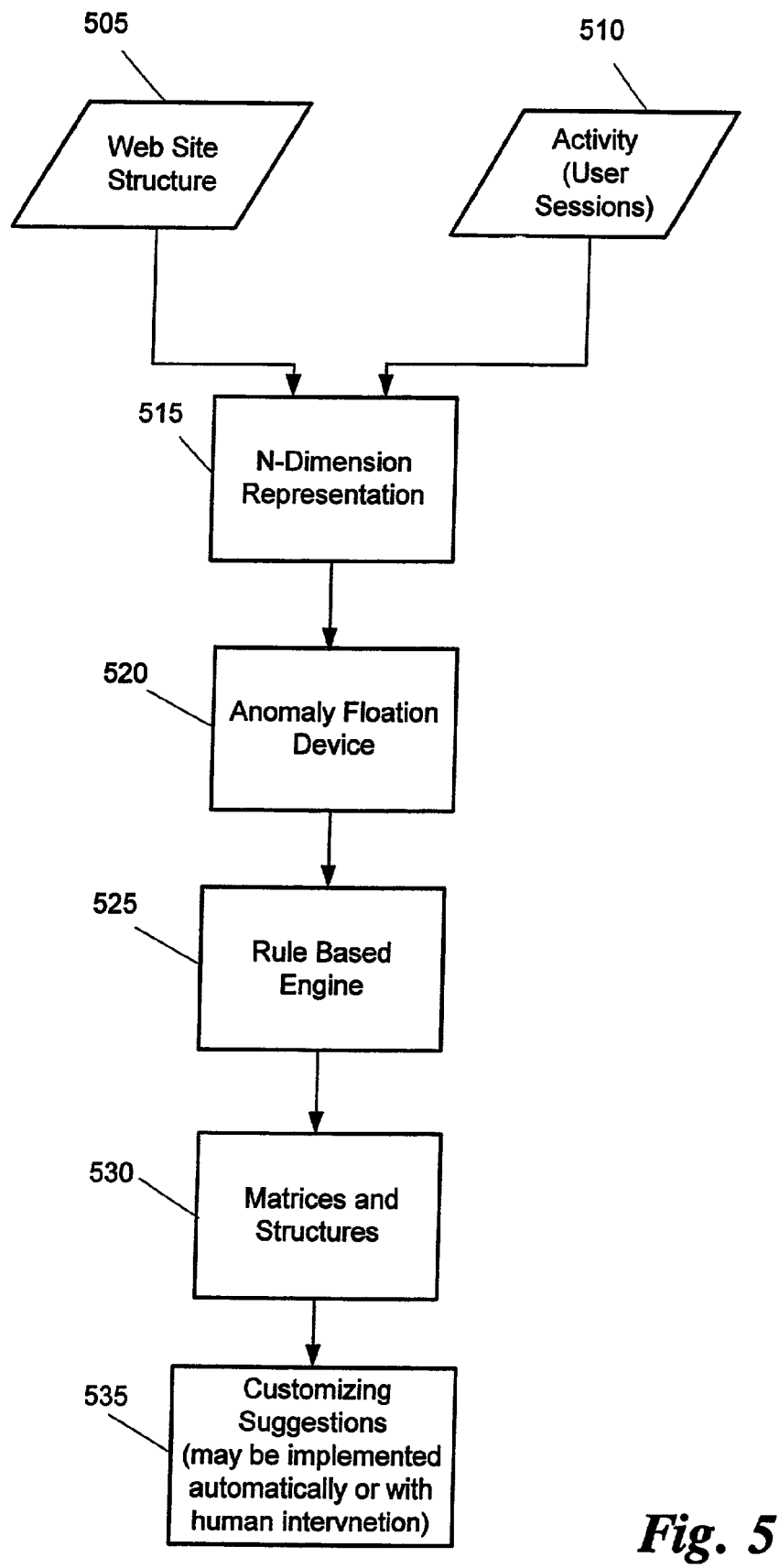
FIG. 5 is a block diagram illustrating the operation of an exemplary embodiment of the invention.

FIG. 5 is a block diagram illustrating the operation of an exemplary embodiment of the invention. This exemplary embodiment utilizes the invention on a host server, wherein the web site structure is already known, shown as web site structure 505. In an alternative exemplary embodiment the invention could be utilized on a far-server, wherein communication with the far-server containing the web site could be established. After establishing contact, this embodiment would parse the web site to obtain the web site structure 505. Parsing is the process by which the invention gathers data about various aspects of the web site. With either embodiment, the web site structure 505 would include data about the connectivity of its objects of interest and other parameters, such as, but not limited to the distance data, the links data, class data, identifiers, names and aliases to objects of interest, children and parent relationships to certain pages, and network addresses.

FIG. 5 illustrates the activity 510 associated with the web site. This activity 510 is established by tracking the activity 510 of the users which use the web site. This embodiment has the ability to specify the specification it would employ in tracking the activity on the web site. This allows versatility in how the user sessions are tracked, and what parameters are employed to track the user activity on the web site. The tracking of the activity 510 associated with the web site may be packaged into user sessions, usually defined collectively by the identity of the user accessing the site, the location of the pages each user accessed, the order those pages were accessed, and the time which the access occurred.

FIG. 5 further illustrates that the web site structure 505 and the activity 510 associated with the web site are connected to and establish the means to generate the N-dimension representation 515. The N-dimension representation establishes the dimensions needed to represent the web site structure 505 information and the activity 510 associated with the web site in matrices and structures.

The N-dimension representation 515 is connected to the anomaly floatation device 520. The anomaly floatation device 520 establishes the low-level rules and parameters by which the anomalies are detected. The anomalies are the differences between the activity 510 associated with the web site and the expected user activity based on the web site structure 505 (the difference between the designer intent and expectation, and the actual site visitors behavior in a web site). All difference between the expected behavior and the actual behavior is an anomaly (to some extent), because the designer of the web site did not intend that action by the user. Not every unexpected action by a user is an anomaly worth fixing; however, many anomalies frustrate users and are in direct conflict with the goals of the web site owners. These anomalies may be described as follows:

For Anomaly 1, step-distance anomaly, the objective is to find an anomaly between the number of accesses (the number of hits) in a particular step, and the distance between two objects. If an anomaly occurs, it may suggest creating a link where it is absent. Example: Referencing Table 1, assume the examining of the traffic from object 8 to object 10. Further assume, that the distance from object 8 to 10 is 2, and that the distribution of hits among the various steps is as depicted in Table 1.

TABLE 1

Illustrating step-distance anomaly.

| Steps taken to access object 10 from object 8 | hits on object 10 |
|---|---|
| 1 | 0 |
| 2 | 16 |
| 3 | 0 |
| 4 | 37 |
| Total hits on object 10 | 61 |
| Distance from object 8 to object 10 | 2 |

There are two reasons why there is an anomaly in Table 1. The designer of the site intended that visitors will need 2 steps (2 clicks) in order to get from object 8 to 10, and designed a site in which the minimum distance between these objects is 2. Yet, a high number of hits occur in step 4 with relation to hits in step 2 (the distance). Moreover, a high number of hits are found in step 4 (37) with relation to the total number of hits (61), while step 4 is not the distance.

An embodiment of the present invention include anomaly floatation devices 520 attached to anomaly 1. These anomaly floatation devices 520 notify when an anomaly occurs. Anomaly floatation device 520 X compares the number of hits arriving in any given number of steps to the number of hits arriving in exactly the distance between two objects. Anomaly floatation device 520 Y compares the number of hits arriving in any given number of steps to the total number of hits between two objects. Since two highly connected objects will experience a lot of inter node traffic at steps greater than the distance, the number of hits to compensate for that needs to be discounted. Several methods may be employed to discount the number of hits, including, but not limited to the following:

1. Factoring in the number of routes between two objects (experiments have shown this to be a restrictive measure).
2. Factor in the number of links to the examined page.
3. Factor in the number of links from the examined page.

The objective of Anomaly 2, the no-link anomaly, is to find which objects should have a link between each other, when there is no direct link between them. For Example: Assume the examination of the traffic from object 5 to object 8. Further assume that the distance from object 5 to object 8 is 2 (there is no direct link between the two objects). The invention finds that the total number of hits from object 5 to 8 at step 2 was 35, yet the range of hits from object 5 to any other object ranged from 10 to 45. This indicates that the invention might want to consider adding a link from object 5 to object 8. A more formal version of the no-link anomaly:

Version A:
  Examine object I. For all objects, K, where distance (I,K)>1:
    (# of hits from I to K distance 2 and up)>M*highest number of hits from I to any object that has a distance of 1 from I.
  M is a number between A and 1, where A is the lowest non-zero object number of hits distance 1 to I divided by the highest number of hits from I to any object that is distance 1 from I (10/45 in our example).

Anomaly 3, the dominant anomaly, is an arrival to an object of interest anomaly. For example, an object C is put in the center and it can be examined. The objective is to find a dominant object of interest among all the objects of interest that arrive at object C, at a given step. For example: let's put object C in the center (i.e., object C is the centric object), and examine Table 2.

TABLE 2

Illustrates the dominant object arriving at a centric object anomaly.

| Arrival at object C from object | number of hits |
|---|---|
| 2 | 253 |
| 3 | 4 |
| 5 | 22 |
| 6 | 11 |
| 7 | 10 |

As can be inferred from Table 2 above, object 2 is dominant, and therefore is a candidate for a direct link from object C. The following definitions will be introduced, in order to define the anomaly:

C is the centric object.
D is the dominant object.
$A_1$–$A_n$ refer to all other objects that are linked to object C in step S.
SUM refers to the total number of hits from any object to object C at step S.
T reflects the total number of hits between objects D and C (and is taken from the total hits matrix).

An anomaly is reported if D-C hits at step S is more than X % of SUM, unless:
There is a direct link between D and C, or
D–C hits at step S is less than 10% of T Anomaly floatation device 520 A evaluates if more than X% of the total traffic between two nodes happens at a certain step, while Anomaly floatation device 520 B evaluates if more than Y % of the traffic arriving at this object in a given step is from a dominant node. Both Anomaly floatation devices 520 must evaluate to true in order to find anomaly 3. Note that the above exemplary illustration in Table 2 found a pattern of where only one object is dominant. The concept of the dominant anomaly may easily be extended to include additional patterns.

Anomaly 4, the deficiency anomaly, is as an arrival to object of interest anomaly. An object C is put in the center and examined. The objective is to find a "deficiency" anomaly among the objects that arrive to object of interest C in a given step. One of the rules that can emerge from this anomaly is a recommendation to remove an existing link.

TABLE 3

Illustrates the deficiency object arriving at a centric object of interest anomaly.

| Arrival to object C from object | number of hits |
|---|---|
| 2 | 100 |
| 3 | 4 |
| 5 | 96 |
| 6 | 100 |
| 7 | 100 |

For example: let's put object C in the center (i.e., object C is the centric object). As can be inferred from Table 3, object 3 is deficient, and, therefore, the direct link from object C to object 3 (if it exists) is a candidate to be removed.

Using the definitions of anomaly 3, anomaly 4 can be formulated as follows. The invention reports an anomaly if D-C hits at step S is less than X% of SUM, unless:
there is no direct link between objects D and C, and
step S is greater than 3

Note that the above exemplary illustration found a pattern of where only one object is deficient. This anomaly may easily be extended to include additional patterns.

Anomaly 5, the dominant-connect anomaly, may be viewed as a connected to object of interest anomaly. An object is placed in the center and examined. The objective is to find a dominant object of interest among all the objects of interest that connect from object of interest C at a given step. This Anomaly is similar to anomaly 3, the dominant anomaly, but it is being performed in the reverse direction.

Anomaly 6, the deficiency-connect anomaly, may be viewed as a connected to object of interest anomaly, similar to the dominant-connect anomaly. An object C is placed in the center and examined. However, the objective is to find a "deficiency" anomaly among the objects that connect from object of interest C in a given step. One of the rules that can emerge from this anomaly is a recommendation to remove an existing link. This Anomaly is similar to Anomaly 4, the deficiency anomaly, but it is being performed in the reverse direction.

Anomaly 7, the high access ratio anomaly, checks to see if certain objects not directly linked together should be, based on the ratio of traffic from immediate neighbors to more distant objects.

Assume the traffic to object 7 from object 5 is examined. Further assume that the distance from object 7 to object 5 is 2 (there is no direct link between the two objects). The total number of hits to object 7 from object 5 at step 2 was 47, yet the range of hits to object 7 from any other object ranged from 10 to 45. This indicates a need to consider adding a link from object 5 to object 7.

The links in a web site are unidirectional (as oppose to bi-directional). As a result, applying the rules on a page and the set of links and pages that can be reached from it may generate different findings than applying the rules on a page and the set of links and pages that reach to it. Anomaly 7 is, therefore, similar to anomaly 2. But, in contrast to anomaly 2, it is based on traffic referred into the object and not on the traffic going out from the object. The Anomaly floatation devices 520 setting is used in the computation of a comparison value, rather than being a comparison value itself. The number of hits between two objects arriving in exactly the distance between them is called distanceHits. This anomaly compares distanceHits between two objects, 2 or more steps apart, to the number of hits from the destination node's parents. Anomaly floatation devices 520 determines exactly how to perform this comparison.

Anomaly 8, the threshold-dominant anomaly, identifies candidates for direct linking. It assesses which object is referring the most traffic (termed the 'dominant') to a given page at various step distances. However, an additional constraint is imposed in that the utility of the link must exceed a given threshold.

Anomaly 8 is similar to Anomaly 3, and is tested only if anomaly 3 activated. As explained above, anomaly 3 found a strong association between two pages. One possible recommendation in this case is to connect the two pages with a link. However, one cannot add links automatically every time anomaly 8 is activated. It could be the case that the site is so well connected, that adding a link will not add much improvement to the efficiency of the web site.

In anomaly 8, the web site may be represented as an electrical circuit. Each individual step in a linear path contributes a resistance of 1. A single path of N steps therefore has a resistance of N. Paths of varying lengths are assumed to exist in parallel, and add as the reciprocal of the sum of individual reciprocals of path resistances. Possible path overlaps between paths of varying lengths are ignored. In short, each link is represented as a resistor in the electric circuit. Using circuit analysis equations, the effective resistance between the two objects (=pages)are calculated. A direct link between the two pages are added, and a check is made for the new effective resistance between the two pages. A comparison is made of the two resistance to check how much improvement the new link provides in terms of reducing the effective resistance between the two pages. If it is below the threshold, adding a link will not be recommended. The intuition being, the more paths there are (the more resistors there are) between the two pages, the less an additional path (an additional resistor) will improve the site (reduce the effective resistance).

Anomaly 9, the complete-a-link anomaly, checks to see if certain objects not directly linked together should be, based on the ratio of traffic from immediate neighbors to more distant objects.

This anomaly is also an extension of anomaly 3 and is tested only if Anomaly 3 is fired. As explained above, Anomaly 3 found a strong association between two pages. Anomaly 9 checks if adding a link between the two pages is in par with the traffic at the originating node. For example, imagine that after applying anomaly 3 on two objects, object A and object B, it is found that there is high association between the two objects. A check is made, whether adding a link is a viable option to reduce the number of clicks visitors need to make (other options might be grouping information, moving information from one page to the other, etc.). It is further assumed, in this example, that 1000 visitors followed the links from object A to object B. However, the traffic on each one of the outgoing links from object A is at least 10,000 visitors. If a link cannot be added to object A (for example, object A has too much clutter or connections), it would not make sense to replace any link with a link to object B, because this link will have much less traffic than the link that is removed.

Anomaly 9 assumes that if a direct link is added between two nodes, then all the traffic, which went through these two objects, will traverse this link. It then compares this traffic with the traffic values on the existing child objects of the originating node. If X % of the links have less traffic than the projected traffic on the new link, Anomaly 9 is activated.

The anomaly floatation device 520 is connected to the rule engine algorithm 525 as illustrated in FIG. 5. The rule engine algorithm 525 is a rule based engine that establishes the rules by which the anomalies found by the anomaly floatation device 520 are grouped in preparation for making recommendations on web site modification. Preferably, these groupings are in accordance with the patterns established by the activity 510 associated with the web site and the expected activity based on the web site structure 505. The anomaly floatation device 520 may be considered to be utilizing rules, similar to the rule engine algorithm 525, but at a lower level. Whereas the rule engine algorithm 525 utilizes higher level rules and organizes the information for representation and recommendations.

The rule based algorithm 525 is connected and is the means used to generate matrices and structures 530. As detailed herein, there are several structures and matrices in which the information may be organized by the rule based engine 525. These matrices and structures 530 may be, but are not limited to, an elements data structure, a session step data structure, a SPUS structure, a TUS structure, a CLASS structure, a TC structure, a distance matrix, a links-to matrix, a links-from matrix, a total accesses-to matrix, a total access-from matrix, and an access matrix. These data structures and matrices 530 are utilized to store and present statistical data about user interaction with the web site. The data structures and matrices 530 may be divided into various categories and into the following groups:

1. Dimensions—provide knowledge about the total number, and size of various components, allowing the determination of the dimensions of various data structures.
2. Web site Structure—data structures that illustrate the web site in terms of substance and connectivity.
3. Access statistics—provide information on various aspects of visitor access patterns to the web site.
4. Session statistics—provide statistics about visitors access patterns. As opposed to the access statistics data structures, where individual accesses are examined, here the individual accesses to sessions are grouped, and provide several data representations that examine aspects of visitor behavior within a session.
5. Aggregate statistics—provide intra-session statistics.

Having defined the groups, the data structures of each one of the groups may be described.

The various aspects, variables, and data structures related to dimensions are as follows:

1. session step data structure—the maximum number of steps in any of the sessions is used to allocate memory and define the various tables.
2. elements data structure—the number of elements (or number of objects). This number is used to allocate memory and define the various tables.
3. SPUS structure—the total number of Steps Per User Sessions.
4. TUS structure—the Total number of User Sessions.
5. Class structure—the Class for each object of interest in the web site.
6. TC structure—the Total number of Classes in the web site.

Thus, the web site structure 505 may be closely described by data about the connectivity of its objects of interest and other parameters as follows:

1. Distance matrix—a two-dimensional matrix that stores the shortest distance from one object to another in the site.
2. links-to matrix—a two-dimensional matrix that stores the number of links to a certain object by a particular step. One skilled in the art will recognize that it is common to represent a matrix, especially in programming, by representing the first object with the index 0, the second object with the index 1, and so forth, by placing the indices representing the objects within the "[ ]". Thus, for example the objects may be represented as follows in the links-to-matrix: the [3] [2] element in the matrix represents the number of objects from which one can get to the $4^{th}$ object of interest (index [3]) in three or less steps (index [2]).
3. links-from matrix—a two-dimensional matrix that stores the number of links from a certain object to other objects of interest by a specific step or less.
4. The class of each object (which is determined by distance from the base page).

The access matrix is one of the matrices that describes the interaction of the user with the web site (user session). The access matrices' parameters are as follows:

1. Access matrix—a three-dimensional matrix. Each element in the matrix describes the number of hits that occurred from one object to another at a certain step. The first dimension designates the "from object", the second dimension designates the "to object", and the third dimension designates the step. Therefore, an element in the matrix describes the number of accesses from the "from" object to the "to" object at a certain step within the session.
2. total accesses-to matrix—the total number of accesses to a certain object (no matter from where) in a particular step within a session.
3. total accesses-from matrix—the total numbers of accesses from a certain object (no matter to where) in a particular step within the session.

Thus, the access matrix is a three dimensional matrix, where each element in the matrix describes the number of hits that occurred from one object to another at a certain step. When filling up the matrix, direct hits are included as well as indirect hits. The term indirect hits mean hits from object A to object D via one or more other objects (let's say, objects B and C). An illustrative example is provided below. Assume the following session:

1=>2=>3=>4=>5

The user started the session by accessing object 1. Then he or she accessed object 2, 3, 4, and 5 by this order. Further assume the distance between adjacent objects in the session is 1.

The Access matrix includes all the direct hits, which are: 1=>2; 2=>3; 3=>4; 4=>5

But it also includes the indirect hits. From object 1, there are the following indirect hits: 1=>3; 1=>4; 1=>5

The rest of the indirect hits in this session are: 2=>4; 2=>5; 3=>5

One of these hits will be taken, 1=>5, and it will show how to update the access matrix to include this hit. The distance from object 1 and object 5 is 4. Therefore, the corresponding entry will be incremented (from object 1 to object 5 at step 4) by 1.

Other aspects of the user's sessions, expressed in various averages, may be described as follows:

1. The average number of steps in a session.
2. The average number of steps in sessions at which an object of a certain class appears.
3. The average number of steps in sessions at which a certain object of interest appears.
4. The average number of steps from the beginning of a session until a particular object has been accessed may be expressed as the object of interest vector. In this average, only sessions in which the object of interest actually appeared are included.
5. The average steps from object of interest matrix is a vector that stores the average number of steps from the point a particular object has been accessed, until the end of the session. In this average, only sessions in which the object of interest actually appeared are included.

6. The object of interest close to start is a vector that stores a number that describes how close a certain object is to the start of a session. The number is a positive number and the bigger it is, the closer the object is (on average) to the beginning of a session.

Finally, the aggregate statistics are also summarized in matrices as follows:

1. The numbers of accesses (or hits) a certain object incurred.
2. Total hits matrix is a two-dimensional matrix that stores the total number of hits from one object to another. It is created by "collapsing" the step dimension of the three-dimensional access matrix into a two-dimensional matrix that includes only the from object and to object dimensions. The from object A to object B entry may be examined. All the entries corresponding to step 1 to the maximum number of steps are added, and put it in the new total hits matrix.
3. Total steps matrix is a two-dimensional matrix that stores the total number of steps that were used in all the accesses from one object to another. It is created by "collapsing" the step dimension of the three-dimensional access matrix into a two-dimensional matrix that includes only the "from" object and "to" object dimensions. As opposed to the total hit matrix discussed above, in the total steps matrix all hits are not regarded as equal. Instead, a weight is assigned to each one of the steps to allow compensation for the step dimension. In examining the "from" object A "to" object B entry. It will be assumed that at step 1 there were 43 hits, at step 2 there were 32 hits, and at step 3 there were 21 hits. The entry from object A to object B in the total steps matrix will be: (1*43)+(2*32)+(3*43), or 236.
4. The Step Median Calculation (SMC) matrix. This is a two-dimensional matrix, the first dimension is the from object, and the second is the to object. Each entry is the distance from an object A, to an object B, divided by the average number of steps detected between them. The average number of steps can be determined by dividing the total number of steps from object A to object B with the total number of hits from object A to object B. Generally speaking, if the number in the SMC matrix is close to 1, then the web site has a good link design, because the site visitors followed the design which determine a certain distance from one object to another. If the number in the SMC matrix is close to 0, then something is wrong and an anomaly may exist which needs correction.

In an alternative embodiment, the information from the web site structure 505 and the activity 510 associated with the web site, may merely be maintained to process as necessary and generate suggestions for customizing the web site. Preferably this processing applies the anomaly flotation device and the rule based engine in conjunction with the patterns established by the activity 510 associated with the web site and the expected activity based on the site structure 505.

By establishing the data generated by the anomaly floatation device 520 and the ruled based algorithm 525 into matrices and structures, the data is organized into an easy readable format for providing customizing suggestions 535. After customizing suggestion have been established, they may be implemented automatically by one embodiment, implemented through human intervention by another embodiment, or offer a combination of options for human intervention implementation and automatic implementation of the customizing suggestions 535. The embodiment shown in FIG. 5 offers the combination of options for human intervention implementation and/or automatic implementation of the customizing suggestions 535.

In one exemplary embodiment the invention could implement the customizing suggestions 535 after each user activity 510. In this exemplary embodiment the web site structure 505 would be customized after each activity 510 associated with the web site. This exemplary embodiment would likely be implemented at the cost of processing time, but may find practical use in some applications.

In another exemplary embodiment, the invention could implement the customizing suggestions 535 after a preset amount of activity 510 associated with the web site. This preset amount of activity may be set by the user or generated by other parameters.

Yet, in another exemplary embodiment, the invention could implement the customizing suggestions 535 at random times and not be dependent on the amount of activity 510 associated with the web site.

All the aforementioned exemplary embodiments may be implemented by always basing the customizing suggestions 535 on the original web site structure. Thus regardless of the customization of the web site structure 505 that has occurred since the original web site structure 505 was intact, future customization suggestions are based on the activity 510 and the original web site structure 505, for generating future customization suggestions 535.

Still other exemplary embodiments, may implement all the aforementioned embodiments by always basing the customizing suggestions 535 on the web site structure 505 on a dynamic basis. Thus, every time the web site structure 505 is customized, whether automatically or through human intervention, the next customization suggestions 535 will be based on the activity 510 and the web site structure 505 at the time the customization suggestions 535 are generated.

Though certain of these anomalies and rules are described fully herein, one skilled in the art will realize that numerous others may become apparent and will be utilized in the future, in various embodiments of the invention. Likewise, the present invention has been described in relation to particular embodiments which are intended in all respects to be illustrative rather than restrictive. Those skilled in the art will understand that the principles of the present invention may be applied to, and embodied in, various program modules for execution on differing types of computers and/or equipment, operating in differing types of networks, regardless of the application. Alternate embodiments will become apparent to those skilled in the art to which the present invention pertains without departing from its spirit and scope. Accordingly, the scope of the present invention is described by the appended claims and supported by the foregoing description.

What is claimed is:

1. A method for modifying the structure of a network accessible web site based on an analysis of activity associated with the web site, the method comprising the steps of:
   identifying a web site comprising a plurality of objects of interest including a plurality of pages within the website;
   identifying one or more structural relationships for navigating between the plurality of objects of interest;
   identifying within monitored user interactions a plurality of sequential user accesses navigating between the plurality of objects of interest and determining user navigational objectives;
   maintaining data representative of said objects of interest, structural relationships including links between objects, sequential user navigational accesses, and determined user navigational objectives; and applying a set of rules to said data to generate a recommendation for modifying the structural relationships, including links, between objects of interest to influence alternate future user navigation between objects of interest.

2. The method of claim 1, wherein the web site comprises a home page, and a plurality of objects of interest, the home page and plurality of objects of interest being accessible by a network address.

3. The method of claim 2, wherein the step of identifying one or more structural relationships for navigating the plurality of objects of interest further comprises the steps of:
accessing said web site via said network address;
parsing structure data of said web site to identify links between objects of interest; and
storing data representative of said links as structural relationships.

4. A method for modifying the structure of a network accessible web site based on an analysis of activity associated with the web site, the method comprising the steps of:
monitoring activity associated with said web site;
maintaining data representative of said activity and a present structure of said web site;
applying a set of rules to said data to generate a recommendation; and
modifying said structure of said web site based on said recommendation
wherein the step of identifying said present structure of said web site further comprises the steps of:
accessing said web site via said network address;
parsing the structure data of said web site to generate said present structure; and
storing data representative of said present structure; and
wherein the objects of interest of the web site have an inter-connection relationship to each other, numeric identifiers, names, and aliases to the names, and the step of parsing the structure data further comprises at least one of the following steps:
(a) retrieving said names of said objects of interest;
(b) retrieving said numeric identifiers of said objects of interest;
(c) retrieving said aliases corresponding to said objects of interest;
(d) retrieving said inter-connection relationship of said objects of interest;
(e) retrieving a list of children, wherein said children are the identities of all said objects of interest that may be accessed directly from a particular object of interest;
(f) retrieving a list of parents, wherein said parents are the identities of all said objects of interest that have direct access to a particular object of interest; and
(g) retrieving a list of page distances, wherein said page distances are the number of objects of interest that must be accessed to get from one object of interest to a different object of interest.

5. A computer-readable medium having computer executable instructions for performing the steps recited in claim 1.

6. A computer-readable medium having computer executable instructions for performing the steps recited in claim 2.

7. A computer-readable medium having computer executable instructions for performing the steps recited in claim 3.

8. The method of claim 2, wherein identifying within monitored user interactions a plurality of sequential user accesses navigating between the plurality of objects of interest comprises the steps of:
identifying a user of said user accesses;
assembling the user accesses of a single user into a user session;
mapping data associated with said user session; and
storing said data associated with said user session in a data storage means.

9. The method of claim 8, wherein the step of mapping the data further comprises the following steps:
retrieving the order of user accesses to said web site's objects of interest; and
retrieving the time of said user accesses to said web site's objects of interest.

10. A computer-readable medium having computer executable instructions for performing the steps recited in claim 8.

11. A computer-readable medium having computer executable instructions for performing the steps recited in claim 9.

12. A method for modifying the structure of a network accessible web site based on an analysis of activity associated with the web site, the method comprising the steps of:
identifying a web site comprising a plurality of objects of interest including a plurality of pages within the website;
identifying one or more structural relationships for navigating between the plurality of objects of interest;
identifying within monitored user interactions a plurality of sequential user accesses navigating between the plurality of objects of interest and determining user navigational objectives;
maintaining data representative of said objects of interest, structural relationships including links between objects, sequential user navigational accesses, and determined user navigational objectives;
applying a set of rules to said data to generate a recommendation for modifying the structural relationships, including links, between objects of interest to influence alternate future user navigation between objects of interest; and
modifying said structure of said web site based on said recommendation;
wherein the web site comprises a home page, and a plurality of objects of interest, the home page and plurality of objects of interest being accessible by a network address, and further comprising the step of identifying said present structure of said web site; and
wherein said maintaining step further comprises at least one of the following steps:
(a) creating an elements data structure, wherein said elements data structure indicates a total number of objects of interest within said web site;
(b) creating a session step data structure, wherein said session step data structure indicates the maximum number of steps in any of said user sessions;
(c) creating a SPUS structure, wherein said SPUS structure indicates a total number of steps per user session;
(d) creating a TUS structure, wherein said TUS structure indicates a total number of user sessions;
(e) creating a CLASS structure, wherein said CLASS structure indicates a class for each object of interest in said web site; and
(f) creating a TC structure, wherein said TC structure indicates a total number of said classes in said web site.

13. The method of claim 12, wherein said maintaining step further comprises at least one of the following steps:

(a) creating a distance matrix, said distance matrix having two dimensions, wherein said distance matrix indicates the shortest object distance;
(b) creating a links-to matrix, said links-to matrix having two dimensions in the form [x][y], wherein said links-to matrix indicates the number of links to a particular object of interest by a specific Step or less, the number of links is indicated by [y], the specific Step or less is indicated by [x];
(c) creating a links-from matrix, said links-from matrix having two dimensions in the form [x][y], wherein said links-from matrix indicates the total number of links from a certain object of interest to other objects of interest by a specific Step or less, the total number of links to other objects of interest being indicated by [x], and the specific Step or less being indicated by [y];
(d) creating a total accesses-to matrix, wherein said total accesses-to matrix indicates the total number of accesses to a particular object of interest in a specific Step within said user session;
(e) creating a total access-from matrix, wherein said total access-from matrix indicates the total number of accesses from a particular object in a specific step within said user session; and
(f) creating an access matrix, said access matrix having three dimensions in the form [x][y][z], wherein said access matrix indicates the number of times an object of interest was accessed from one particular object of interest to a different object of interest at a specific Step, from one particular object of interest being indicated by [x], to a different object of interest being indicated by [y], and the specific Step being indicated by [z].

14. A computer-readable medium having computer executable instructions for performing the steps recited in claim 12.

15. A computer-readable medium having computer executable instructions for performing the steps recited in claim 13.

16. A method for modifying the structure of a network accessible web site based on an analysis of activity associated with the web site, the method comprising the steps of:
identifying a web site comprising a plurality of objects of interest including a plurality of pages within the website;
identifying one or more structural relationships for navigating between the plurality of objects of interest;
identifying within monitored user interactions a plurality of sequential user accesses navigating between the plurality of objects of interest and determining user navigational objectives;
maintaining data representative of said objects of interest, structural relationships including links between objects, sequential user navigational accesses, and determined user navigational objectives;
applying a set of rules to said data to generate a recommendation for modifying the structural relationships, including links, between objects of interest to influence alternate future user navigation between objects of interest; and
modifying said structure of said web site based on said recommendation;
wherein the web site comprises a home page, and a plurality of objects of interest, the home page and plurality of objects of interest being accessible by a network address, and further comprising the step of identifying said present structure of said web site; and
wherein the rules are applied utilizing a rule engine algorithm and an anomalies floatation device, the step of applying a set of rules further comprising the steps of:
(a) applying a rule of object distance, wherein said object distance is the number of objects of interest that must be accessed to get from one of said objects of interest to a different object of interest;
(b) applying a rule of Step, wherein the Step is the number of objects of interest that is actually accessed to get from one of said objects of interest to a different said objects of interest during said user session; and
(c) applying a rule of Class, wherein said Class is the number of objects of interest that must be accessed to get from said homepage of said web site to said objects of interest.

17. The method of claim 16, wherein said step of applying a set of rules further comprises the steps of:
transferring the maintained data to said anomaly floatation device;
comparing an expected activity data to said data representative of said activity, wherein said anomalies floatation device having an output comprised of anomalies; and
grouping said anomalies according to said activity, wherein said grouping is performed by said rule engine algorithm to indicate recommendations.

18. The method of claim 17, wherein the step of comparing further comprises at least one of the following steps:
(a) applying a step-distance anomaly, wherein said step-distance anomaly is based on at least the number of accesses in the particular Step and the distance between two particular objects of interest;
(b) applying a no-link anomaly, wherein said no-link anomaly is based at least in part on the number of accesses in a particular Step and the distance between the two particular objects of interest, the two particular objects of interest having no direct hyperlink;
(c) applying a dominant anomaly, wherein said dominant anomaly is based at least in part on a dominant object of interest from which the most accesses are made to a particular object of interest in a particular Step;
(d) applying a deficiency anomaly, wherein said deficiency anomaly is based at least in part on a deficient object of interest to which a deficient number of accesses are made from a particular object of interest in a particular Step;
(e) applying a dominant-connect anomaly, wherein said dominant-connect anomaly is based at least in part on a dominant number of accesses being made from said dominant object of interest among a plurality of connected objects of interest to a particular object of interest in a particular Step;
(f) applying a deficiency-connect anomaly, wherein said deficiency-connect anomaly is based at least in part on a deficient number of accesses being made from a deficient object of interest among a plurality of connected objects of interest to a particular object of interest in a particular Step; and
(g) applying a high access ratio anomaly, wherein said high access ratio anomaly is based at least in part on the number of accesses in a particular step using only one direction of access and the distance between the two particular objects of interest, the two particular objects of interest having no direct hyperlink.

19. The method of claim 18, wherein if the step of applying a dominant anomaly is applied, the step of comparing further comprises at least one of the following steps:
   (h) applying a threshold-dominant anomaly, wherein said threshold-dominant anomaly is based at least in part on the most accesses to a given object of interest at a plurality of step distances, the accesses to said given object of interest must exceed a pre-set minimum; and
   (i) applying a complete-a-link anomaly, wherein said complete-a-link anomaly is based at least in part on the ratio of accesses from a particular objects of interest directly linked to another versus a particular objects of interest linked to others by a greater distance.

20. A computer-readable medium having computer executable instructions for performing the steps recited in claim 16.

21. A computer-readable medium having computer executable instructions for performing the steps recited in claim 17.

22. A computer-readable medium having computer executable instructions for performing the steps recited in claim 18.

23. A computer-readable medium having computer executable instructions for performing the steps recited in claim 19.

24. The method of claim 1, wherein the step of identifying a plurality of sequential user accesses navigating the plurality of objects of interest comprises the steps of:
   identifying a user of said user accesses;
   assembling the user accesses of a single user into a user session;
   mapping data associated with said user session; and
   storing said data associated with said user session in a data storage means.

25. The method of claim 24, wherein the step of mapping the data further comprises the steps of:
   retrieving the order of user accesses to said web site's objects of interest; and
   retrieving the time of said user accesses to said web site's objects of interest.

26. A computer-readable medium having computer executable instructions for performing the steps recited in claim 24.

27. A computer-readable medium having computer executable instructions for performing the steps recited in claim 25.

28. A method for modifying the structure of a network accessible web site based on an analysis of activity associated with the web site, the method comprising the steps of:
   identifying a web site comprising a plurality of objects of interest including a plurality of pages within the website;
   identifying one or more structural relationships for navigating between the plurality of objects of interest;
   identifying within monitored user interactions a plurality of sequential user accesses navigating between the plurality of objects of interest and determining user navigational objectives;
   maintaining data representative of said objects of interest, structural relationships including links between objects, sequential user navigational accesses, and determined user navigational objectives;
   applying a set of rules to said data to generate a recommendation for modifying the structural relationships, including links, between objects of interest to influence alternate future user navigation between objects of interest; and
   modifying said structure of said web site based on said recommendation;
   wherein said maintaining step further comprises at least one of the following steps:
   (a) creating an elements data structure, wherein said elements data structure indicates a total number of objects of interest within the website;
   (b) creating a session step data structure, wherein said session step data structure indicates the maximum number of steps in any of said user sessions;
   (c) creating a SPUS structure, wherein said SPUS structure indicates a total number of steps per user session;
   (d) creating a TUS structure, wherein said TUS structure indicates a total number of user sessions;
   (e) creating a CLASS structure, wherein said CLASS structure indicates a class for each object of interest in said web site; and
   (f) creating a TC structure, wherein said TC structure indicates a total number of said classes in said web site.

29. The method of claim 28, wherein said maintaining step further comprises at least one of the following steps:
   (a) creating a distance matrix, said distance matrix having two dimensions, wherein said distance matrix indicates the shortest object distance;
   (b) creating a links-to matrix, said links-to matrix having two dimensions in the form [x][y], wherein said links-to matrix indicates the number of links to a particular object of interest by a specific Step or less, the number of links is indicated by [y], the specific Step or less is indicated by [x];
   (c) creating a links-from matrix, said links-from matrix having two dimensions in the form [x][y], wherein said links-from matrix indicates the total number of links from a certain object of interest to other objects of interest by a specific Step or less, the total number of links to other objects of interest being indicated by [x], and the specific Step or less being indicated by [y];
   (d) creating a total accesses-to matrix, wherein said total accesses-to matrix indicates the total number of accesses to a particular object of interest in a specific Step within said user session;
   (e) creating a total access-from matrix, wherein said total access-from matrix indicates the total number of accesses from a particular object in a specific step within said user session; and
   (f) creating an access matrix, said access matrix having three dimensions in the form [x][y][z], wherein said access matrix indicates the number of times an object of interest was accessed from one particular object of interest to a different object of interest at a specific Step, from one particular object of interest being indicated by [x], to a different object of interest being indicated by [y], and the specific Step being indicated by [z].

30. A computer-readable medium having computer executable instructions for performing the steps recited in claim 28.

31. A computer-readable medium having computer executable instructions for performing the steps recited in claim 29.

32. A method for modifying the structure of a network accessible web site based on an analysis of activity associated with the web site, the method comprising the steps of:
   identifying a web site comprising a plurality of objects of interest including a plurality of pages within the website;

identifying one or more structural relationships for navigating between the plurality of objects of interest;

identifying within monitored user interactions a plurality of sequential user accesses navigating between the plurality of objects of interest and determining user navigational objectives;

maintaining data representative of said objects of interest, structural relationships including links between objects, sequential user navigational accesses, and determined user navigational objectives;

applying a set of rules to said data to generate a recommendation for modifying the structural relationships, including links, between objects of interest to influence alternate future user navigation between objects of interest; and modifying said structure of said web site based on said recommendation;

wherein the rules are applied utilizing a rule engine algorithm and an anomalies floatation device, the step of applying a set of rules further comprises the steps of:

(a) applying a rule of object distance, wherein said object distance is the number of objects of interest that must be accessed to get from one of said objects of interest to a different object of interest;

(b) applying a rule of Step, wherein the Step is the number of objects of interest that is actually accessed to get from one of said objects of interest to a different said objects of interest during said user session; and (c) applying a rule of Class, wherein said Class is the number of objects of interest that must be accessed to get from said homepage of said web site to said objects of interest.

33. The method of claim 32, wherein said step of applying a set of rules further comprises the steps of:

transferring the maintained data to said anomaly floatation device;

comparing an expected activity data to said data representative of said activity, wherein said anomalies floatation device having an output comprised of anomalies; and grouping said anomalies according to said activity, wherein said grouping is performed by said rule engine algorithm to indicate recommendations.

34. The method of claim 33, wherein the step of comparing further comprises at least one of the following steps:

(a) applying a step-distance anomaly, wherein said step-distance anomaly is based on at least the number of accesses in the particular Step and the distance between two particular objects of interest;

(b) applying a no-link anomaly, wherein said no-link anomaly is based at least in part on the number of accesses in a particular Step and the distance between the two particular objects of interest, the two particular objects of interest having no direct hyperlink;

(c) applying a dominant anomaly, wherein said dominant anomaly is based at least in part on a dominant object of interest from which the most accesses are made to a particular object of interest in a particular Step;

(d) applying a deficiency anomaly, wherein said deficiency anomaly is based at least in part on a deficient object of interest to which a deficient number of accesses are made from a particular object of interest in a particular Step;

(e) applying a dominant-connect anomaly, wherein said dominant-connect anomaly is based at least in part on a dominant number of accesses being made from said dominant object of interest among a plurality of connected objects of interest to a particular object of interest in a particular Step;

(f) applying a deficiency-connect anomaly, wherein said deficiency-connect anomaly is based at least in part on a deficient number of accesses being made from a deficient object of interest among a plurality of connected objects of interest to a particular object of interest in a particular Step; and (g) creating a high access ratio anomaly, wherein said high access ratio anomaly is based at least in part on the number of accesses in a particular step using only one direction of access and the distance between the two particular objects of interest, the two particular objects of interest having no direct hyperlink.

35. The method of claim 34, wherein if the step of applying a dominant anomaly is applied, the step of comparing further comprises at least one of the following steps:

(h) applying a threshold-dominant anomaly, wherein said threshold-dominant anomaly is based at least in part on the most accesses to a given object of interest at a plurality of step distances, the accesses to said given object of interest must exceed a pre-set minimum; and (i) applying a complete-a-link anomaly, wherein said complete-a-link anomaly is based at least in part on the ratio of accesses from a particular objects of interest directly linked to another versus a particular objects of interest linked to others by a greater distance.

36. A computer-readable medium having computer executable instructions for performing the steps recited in claim 32.

37. A computer-readable medium having computer executable instructions for performing the steps recited in claim 35.

38. A computer-readable medium having computer executable instructions for performing the steps recited in claim 34.

39. A computer-readable medium having computer executable instructions for performing the steps recited in claim 35.

40. An apparatus for modifying the structure of a network accessible web site, the apparatus comprising:

a communications means for establishing communications with said web site;

a first input for accepting data representative of structure relationships for navigating objects of interest;

a second input for accepting data representative of sequential user accesses navigating the structure of the web site;

a memory buffer for providing storage for said structure associated with said web site and said navigational activity;

a processing unit for:

identifying a web site comprising a plurality of objects of interest including a plurality of pages within the website;

identifying one or more structural relationships for navigating the plurality of objects of interest;

identifying within monitored user interactions a plurality of sequential user accesses navigating between the plurality of objects of interest and determining user navigational objectives;

maintaining data representative of said objects of interest, structural relationships including links between objects, sequential user navigational accesses and determined user navigational objectives; and applying a set of rules to said data to generate a recommendation for modifying the structural relationships, including links, between objects of interest to influence alternate future user navigation between objects of interest.

41. The method of claim 1, wherein an object of interest comprises a single network accessible document.

42. The method of claim 1, wherein an object of interest comprises a plurality of network accessible documents.

43. The method of claim 1, wherein the user accesses are automated.

44. The method of claim 1, further comprising the step of: creating a single data field representative of combined attributes of the objects of interest, structural relationships, and user access data.

45. The method of claim 1, further comprising the step of: modifying the structural relationships between objects of interest based at least on said recommendation.

46. The method of claim 45, wherein the step of modifying the structural relationships between objects of interest is performed automatically by a computer-readable medium having computer executable instructions for performing the step, based at least in part on said recommendation for modifying the structural relationships between objects of interest of said web site.

47. The method of claim 45, wherein the step of modifying the structural relationships between objects of interest is performed by interacting with said web site structure through human intervention, based at least on said recommendation for modifying the structural relationships between objects of interest.

* * * * *